United States Patent [19]

Jansta et al.

[11] 3,967,018

[45] June 29, 1976

[54] METHOD OF SURFACE TREATMENT OF POLYTETRAFLUOROETHYLENE

[75] Inventors: Jiri Jansta, Kostelec nad Labem; Frantisek Dousek, Prague, both of Czechoslovakia

[73] Assignee: Ceskoslovenska akademie ved, Prague, Czechoslovakia

[22] Filed: Sept. 30, 1974

[21] Appl. No.: 510,731

[30] Foreign Application Priority Data

Oct. 3, 1973 Czechoslovakia .................. 6806-73

[52] U.S. Cl. ............................... 427/430; 428/422
[51] Int. Cl.$^2$ ...................... B32B 27/00; B05D 1/18
[58] Field of Search .. 117/47 A, 61, 119, 138.8 UF, 117/160 R, 169 R, 223, 225; 209/51; 427/430; 428/422

[56] References Cited
UNITED STATES PATENTS

| 2,689,805 | 9/1954 | Croze et al. | 117/65 |
| 2,872,341 | 2/1959 | Stein | 117/138.8 X |
| 2,898,228 | 8/1959 | Kelley | 117/47 |
| 2,906,658 | 9/1959 | Doban | 154/139 |
| 2,923,651 | 2/1960 | Petriello | 154/80 |
| 2,951,774 | 9/1960 | Peck | 117/227 |
| 3,049,437 | 8/1962 | Rejdak | 117/31 |
| 3,167,491 | 1/1965 | Harrison et al. | 204/30 |
| 3,342,634 | 9/1967 | Provisor | 117/223 |

FOREIGN PATENTS OR APPLICATIONS

| 756,814 | 9/1956 | United Kingdom |
| 875,544 | 8/1961 | United Kingdom |

*Primary Examiner*—P.E. Willis, Jr.

[57] ABSTRACT

A technique is described for treating polytetrafluoroethylene surfaces with an amalgam of an alkaline metal to alter the surface thereof chemically and/or physically.

4 Claims, No Drawings

METHOD OF SURFACE TREATMENT OF POLYTETRAFLUOROETHYLENE

BACKGROUND OF THE INVENTION

This invention relates to a technique for treating polytetrafluoroethylene. More particularly, the present invention relates to a technique for etching the surface of polymeric tetrafluoroethylene. The invention also relates to a technique for enhancing the adherency of polytetrafluoroethylene surfaces.

During the past decade, there has been a dramatic increase in the industrial use of polytetrafluoroethylene, so creating a need for the development of novel processing techniques for both its preparation and subsequent use. Prior to applicants' entry into the field, workers in the art recognized that tetrafluoroethylene polymers could be effectively etched or attacked by molten alkaline metals, gaseous fluorine at elevated temperatures or by means of a solution comprising sodium in anhydrous ammonia (See, for example, Brockhaus ABC Chemie, Brockhaus Verlag, Leipzig 1965, Page 1119). Unfortunately, although these techniques were theoretically efficacious, serious impediments essentially precluded their use. Thus, for example, the use of molten alkaline metals in conjunction with polytetrafluoroethylene results in an explosive mixture whereas the use of gaseous fluorine presents inherent toxicity problems. Although liquid (anhydrous) ammonia does not suffer from these deficiencies, its use is practical only at reduced temperatures and elevated pressure. Accordingly, a need has long existed for a commercially feasible alternative for modifying the surface of polytetrafluoroethylene.

SUMMARY OF THE INVENTION

In accordance with the present invention, these prior art limitations are effectively obviated by a novel technique wherein polytetrafluoroethylene surfaces are reacted with a liquid alloy comprising mercury and an alkali metal (amalgam) alone or with an alternative addition of an amalgam of an alkaline earth metal. Reaction is effected at temperatures less than 300°C. It will be understood that the term amalgam as employed herein refers to an alloy of mercury with either an alkali or alkaline earth metal that is liquid at room temperature. Studies have revealed that saturated solutions of alkaline metals, typically lithium, in an inert medium are preferred embodiments of the invention.

Heretofore, it has been the understanding of those skilled in the art that the chemical reactivity of alkali metals in amalgams was sharply limited as compared with the reactivity of the elementary metals. However, it has now been determined that etching of polytetrafluoroethylene surfaces can be effected with even very diluted alkali metal amalgams over a range of temperatures, thereby directly contradicting prior understanding.

The invention will be more fully understood by reference to the use of lithium as the alkali metal in the described amalgam. In the alkali metal series, it is known that the radius of the atoms increases with increasing atomic number from lithium through potassium. Accordingly, lithium, which has the smallest radius of the alkaline metals, readily forms covalent bonds with carbon, so resulting in the destruction or scission of a hydrocarbon chain and the formation of an organometallic compound. This ability to form covalent bonds decreases with increasing atomic number as we proceed from lithium to sodium to potassium. Accordingly, this accounts for the preference in the use of lithium herein. The chemical reaction occurring during the process described may be summarized by reference to equation (1):

$$(CF_2)_n + 2nLi \rightarrow nC + 2nLiF \qquad (1)$$

A further understanding of the chemical reactions occurring during the practice of the present invention will be appreciated by reviewing the following equations wherein an initial surface reaction occurs (equation 2) followed by a group of reactions in the nature of an electrochemical mechanism (equations 3, 4 and 5).

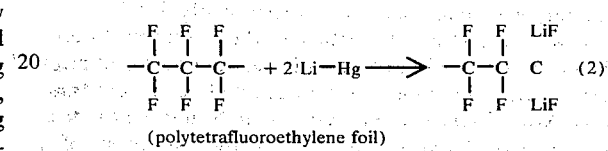

(polytetrafluoroethylene foil)

After the initial decomposition of the polytetrafluoroethylene, further decomposition proceeds by electrochemical means, the lithium amalgam (Li — Hg) serving as anode and providing $Li^+$ ions and electrons in accordance with equation (3).

$$2 LiHg \rightarrow 2 Li^+ + 2e + 2Hg \qquad (3)$$

The polytetrafluoroethylene then becomes an electron acceptor and participates in the reactions shown in equations (4) and (5) below.

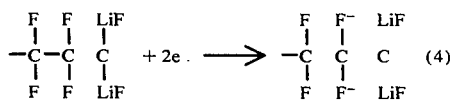

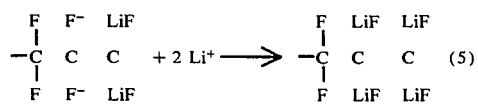

In the described process, electrons yielded by the lithium from the amalgam (equation 3) are led by means of the carbon released in equation (2) to a second $(CF_2)$ group as shown in equation (4), such occurring upon further contact of the product of equation (2) with the amalgam. The required ion closing of the current circuit between the lithium amalgam anode and $(CF_2)n$ cathode of the resultant galvanic element is effected solely by lithium cations which are displaced through the layer of a solid phase created between the electrodes. This contention is vindicated as follows. Initially, if an ion current is created with $F^-$ anions, a white layer of lithium fluoride (LiF) is formed on the surface of the carbon layer, such white layer being readily perceptible. Additionally, the lithium amalgam (Li—Hg) will yield a free lithium atom only after replacement of energy lost during the amalgamation process. However, the lithium can be released as a $Li^+$ ion which is released via the electrochemical reaction. Evidence has revealed that lithium penetrates the carbon layers to a distance which is $10^6$ times larger than the diameter of its own atom, a result which can only occur by diffusion of Li⁺ ions in an electrical field, a typical electrochemical reaction.

The following examples are included solely for the purpose of exposition and are not to be construed as limiting.

EXAMPLE I

A polytetrafluoroethylene foil having a surface area of 4 square centimeters and a thickness of 0.05 centimeters was degreased by boiling with an alkaline solution of a phosphate (50g $Na_3PO_4$ and 20g NaOH per liter) and, after drying in a high vacuum, was sealed in an evacuated glass capsule together with 20 grams of diluted lithium amalgam (0.9 atomic per cent lithium in redistilled mercury, a one-half saturated solution of lithium in mercury at 20°C). The temperature in the ampule was maintained at approximately 23°C.

It was noted that the surface of the foil began to turn black upon initial contact with the amalgam and after 30 minutes of contact the blackening became continuous. After 56 days, the reaction penetrated the foil to a depth of 0.01 cm and resulted in the formation of a compact, brittle, black adherent layer. A cross-sectional cut of the foil revealed that the black layer is clearly defined with no evidence of penetration into the remaining white layer of polytetrafluoroethylene. Analysis of the amalgam revealed that only 16 per cent lithium initially present remained, the remainder thereof being found in the black layer in the form of lithium fluoride.

EXAMPLE II

The process of Example I was repeated with the exception that a sodium amalgam having a concentration of 2.5 atomic per cent sodium was employed. The lower reactivity of sodium was apparent for within the noted time period (56 days), only 2.7 per cent of the sodium had been released from the amount originally present, a black film remaining on the surface of the foil.

EXAMPLE III

The process of Example 1 was repeated with the exception that a potassium amalgam having a concentration of 1.5 atomic per cent potassium was employed. A visible gray trace was found on the surface of the foil and analysis of the amalgam revealed essentially no loss of potassium. Although only slight evidence of the desired effect was apparent, it will be appreciated that such is attributable solely to the rate of reaction and the desired end can be attained upon continued exposure to the amalgam.

What is claimed is:

1. A technique for treating the surface of polytetrafluoroethylene which comprises immersing the polytetrafluoroethylene in an alloy selected from the group consisting of (a) mercury and an alkali metal and (b) mercury and an alkali metal in combination with an alloy of mercury and an alkaline earth metal at a temperature less than 300°C.

2. Technique in accordance with claim 1 wherein said surface is immersed in a mixture of an alloy of an alkali metal and an amalgam of an alkaline earth metal.

3. Technique in accordance with claim 1 wherein said alloy is a saturated solution of lithium in mercury.

4. Technique in accordance with claim 1 wherein said alloy is a saturated solution of sodium in mercury.

* * * * *